United States Patent
Katsumata et al.

(10) Patent No.: US 8,261,710 B2
(45) Date of Patent: Sep. 11, 2012

(54) SEALED LASH ADJUSTER AND SEAL STRUCTURE BETWEEN FIRST AND SECOND PARTS

(75) Inventors: Shouji Katsumata, Gotemba (JP); Akihiko Hosaka, Hadano (JP)

(73) Assignees: Toyota Jidosha Kabushiki Kaisha, Aichi-ken (JP); Nittan Valve Co., Ltd., Kanagawa-ken (JP)

( * ) Notice: Subject to any disclaimer, the term of this patent is extended or adjusted under 35 U.S.C. 154(b) by 224 days.

(21) Appl. No.: 12/681,574

(22) PCT Filed: Oct. 3, 2008

(86) PCT No.: PCT/JP2008/068043
§ 371 (c)(1),
(2), (4) Date: Apr. 2, 2010

(87) PCT Pub. No.: WO2009/044848
PCT Pub. Date: Apr. 9, 2009

(65) Prior Publication Data
US 2010/0242886 A1 Sep. 30, 2010

(30) Foreign Application Priority Data
Oct. 3, 2007 (JP) ................................. 2007-260404

(51) Int. Cl.
*F01L 1/14* (2006.01)
(52) U.S. Cl. ................ 123/90.52; 123/90.43; 123/90.16
(58) Field of Classification Search ............... 123/90.52, 123/90.43, 90.45, 90.46, 90.55
See application file for complete search history.

(56) References Cited

U.S. PATENT DOCUMENTS

| 4,338,894 A * | 7/1982 | Kodama ..................... 123/90.58 |
| 4,679,962 A | 7/1987 | Mihara et al. |
| 2009/0090324 A1 | 4/2009 | Katsumata et al. |

FOREIGN PATENT DOCUMENTS

| FR | 1 177 869 | 4/1959 |
| GB | 909707 | 10/1962 |
| JP | 56-163603 A | 12/1981 |
| JP | 58-084306 A | 6/1983 |
| JP | 59-162311 A | 9/1984 |
| JP | 62-029605 A | 2/1987 |

(Continued)

OTHER PUBLICATIONS

Supplementary European Search Report dated Feb. 8, 2012 issued in corresponding European Patent Application No. 088364401.1.

(Continued)

*Primary Examiner* — Zelalem Eshete
(74) *Attorney, Agent, or Firm* — Sughrue Mion, PLLC

(57) ABSTRACT

A sealed lash adjuster (100A) has a plunger (2), and a body (1A) accommodating the plunger. In addition, the sealed lash adjuster (100A) has a first seal member (5) on a sliding portion of the plunger (2), and has a second seal member (30) on a sliding portion of the body (1A) that faces the sliding portion. Specifically, the lash adjuster (100A) has the first seal member (5) on the sliding portion of the plunger (2) and the second seal member (30) on the opposing sliding portion of the body (1A), such that a space K formed between the first seal member (5) and the second seal member (30) expands when the plunger (2) is pressed inward, and the space K contacts when the plunger (2) protrudes outward.

4 Claims, 7 Drawing Sheets

FOREIGN PATENT DOCUMENTS

| | | |
|---|---|---|
| JP | 62-153404 A | 9/1987 |
| JP | 1-124008 A | 8/1989 |
| JP | 2-109072 A | 8/1990 |
| JP | 08-093419 A | 4/1996 |
| JP | 2002-285808 A | 10/2002 |
| JP | 2005-162138 A | 6/2005 |
| JP | 2006-132660 A | 5/2006 |
| JP | 2007-154869 A | 6/2007 |
| JP | 2009-091907 A | 4/2009 |
| JP | 2011-185150 A | 9/2011 |

OTHER PUBLICATIONS

Korean Office Action for corresponding Korean Patent Application No. 10-2010-7007147 issued on Feb. 27, 2012.

* cited by examiner

MAXIMUM EXTENDED STATE

MAXIMUM CONTRACTED STATE

US 8,261,710 B2

SEALED LASH ADJUSTER AND SEAL STRUCTURE BETWEEN FIRST AND SECOND PARTS

TECHNICAL FIELD

The present invention relates to a sealed lash adjuster and a seal structure between first and second parts.

BACKGROUND ART

Lash adjusters have been put into practical use for automatically adjusting a valve clearance provided between a cylinder head and intake/exhaust valves of an internal combustion engine to substantially zero. With such lash adjusters, clatter noises generated by interference between the cylinder head and the intake/exhaust valves can be eliminated from a functional standpoint, and work to periodically inspect and adjust the valve clearance is no longer necessary from a maintenance standpoint. There is a type of lash adjuster that is externally supplied with oil and utilizes engine oil, for example. In the case of the lash adjuster externally supplied with oil, an unsuitable engine oil injection amount or the use of deteriorated oil increases the risk of air and foreign matter becoming mixed in the oil, and the function of the lash adjuster may be compromised due to these factors. In other words, the function of the lash adjuster externally supplied with oil is dependent on the quality of engine oil maintenance. On the other hand, there is also a sealed type of lash adjuster in which fluid such as oil or the like is sealed within the lash adjuster. With such a sealed lash adjuster, the above-described factors interfering with lash adjuster function can be eliminated.

With regard to sealed lash adjusters, Patent Document 1, for example, proposes a sealed lash adjuster as described below. The sealed lash adjuster proposed in Patent Document 1 provides an oil seal having an X-shaped cross section with two lips (simply called an "X-seal" below) between a body and a plunger. The X-seal can simultaneously seal two fluids on both sides of the seal. Therefore, the sealed lash adjuster has a configuration for simultaneously preventing oil sealed by the X-seal (simply called "enclosed oil" below) from flowing outside and preventing external fluid such as engine oil (simply called "external oil" below) from flowing inside. Note that, other art that can be considered related to the present invention is proposed in Patent Documents 2 to 4, for example.

Patent Document 1: Japanese Patent Publication No. 62-29605
Patent Document 2: Japanese Patent Application Publication No. 2005-162138
Patent Document 3: Japanese Patent Application Publication No. 2006-132660
Patent Document 4: Japanese Utility Model Application Publication No. 01-124008

DISCLOSURE OF THE INVENTION

Problem to be Solved by the Invention

In order to prevent oil sealed by the X-seal from becoming mixed with engine oil, the two fluids (engine oil and sealed oil) must be prevented from mixing, which means that the X-seal must also function as a seal for reciprocating motion. A seal for reciprocating motion generally requires a lubricating oil film to lower friction on the sliding surface. In terms of function, an oil film that extends outside in a pressing operation (an operation in which the sealed lash adjuster contracts) is returned inside in a pulling operation (an operation in which the sealed lash adjuster extends) so as to stop external leakage. However, the X-seal cannot reasonably be made to function as a seal for reciprocating motion.

Here, a plunger operation stroke required for the lash adjuster is normally approximately 2 mm to 2.5 mm, and the plunger sinks to the bottom of the body while the engine is stopped. Therefore, the sliding width (stroke) between the plunger and the body may exceed approximately 2 mm to 2.5 mm following engine cranking from this state, when the plunger reaches a maximum extension in a process where the cam is in the base circle position. Regarding this point, the X-seal does not slide with the body during the reciprocating motion of the plunger and maintains its sealing function through deformation. However, rapid extension of the plunger at engine starting or other times, for example, may cause the X-seal to slide with the body. Therefore, at such times, the X-seal must function as a seal for reciprocating motion and prevent two fluids from mixing due to oil film movement.

However, the mixture of two fluids due to oil film movement occurs when the normal plunger stroke is greater than the width of contact between the X-seal and the body sliding surface. Thus, in order to prevent the mixture of two fluids, the X-seal must be a size that matches the stroke of the plunger. Meanwhile, the sealed lash adjuster is preferably made as compact as possible from the standpoint of increasing the degree of design freedom of the internal combustion engine. However, an increase in the size of the sealed lash adjuster is unavoidable with an X-seal capable of preventing the mixture of two fluids when considering the plunger stroke described above; conversely, it is difficult to prevent the mixture of two fluids with an X-seal that can be applied without increasing the size of the sealed lash adjuster. In other words, it is unreasonable to make the X-seal function as a seal for reciprocating motion. Given this fact, it is clear that simultaneously preventing not only the flow of sealed oil to outside but also the inflow of engine oil from outside using one seal means provided between the body and the plunger is difficult.

At engine starting and cold starting in particular, the sealed lash adjuster extends and quickly reduces the lash to zero to eliminate engine clattering, which is an important function of the sealed lash adjuster. Accordingly, using a sealed lash adjuster 100X shown in FIG. 6 as an example, the spring load of a plunger spring 4 for biasing a plunger 2 is properly set for realizing this function. However, during the contraction operation of the sealed lash adjuster 100X, the speed of the contraction operation is slow compared to the extending speed of the plunger 2 due to the leakage of enclosed oil from a narrow clearance between the plunger 2 and a body 1X.

Thus, given that the extending speed is greater than the contracting speed, the plunger speed in the pressing process and the plunger speed in the pulling process of the sealed lash adjuster 100X become: pulling process plunger speed>pressing process plunger speed.

In addition, the oil to be sealed is customarily selected such that the viscosity of the enclosed oil is greater than the viscosity of the external oil.

The relationship between the pressure distribution of the seal sliding contact surface of the seal for reciprocating motion and the oil film thickness formed can be organized into the formulas shown in Expressions 1 and 2 below according to the fluid lubrication inverse theory, where $h_{OP}$ is the oil film thickness in the pressing process, $|dp/dx|_{max,\ P}$ is the maximum contact pressure gradient on the oil pressure side in the pressing process, $h_OM$ is the oil film thickness in the pulling process, $|dp/dx|_{max, M}$ is the maximum contact pressure gradient on the oil pressure side in the pulling process, μ (pa·s) is the oil viscosity, and U (cm/s) is the plunger speed.

$$h_{op} = \sqrt{\frac{8\mu U}{9|dp/dx|_{max,P}}}$$ [Expression 1]

$$h_o M = \sqrt{\frac{8\mu U}{9|dp/dx|_{max,M}}}$$ [Expression 2]

Based on the above, in the typical sealed lash adjuster 100X that provides one seal means (in this case, a first seal member 5) on the sliding portion of the plunger 2 in order to prevent the outflow of enclosed oil, the oil film thickness formed in the pulling process is greater than the oil film thickness formed in the pressing process (formula: $h_oM > h_{OP}$). FIGS. 7(a) and 7(b) are enlarged schematic diagrams of the oil film thicknesses formed in this manner. In the sealed lash adjuster 100X, a thick oil film of external oil is formed as shown in FIG. 7(a) in the pulling process, while a thin oil film is formed as shown in FIG. 7(b) in the pressing process. This means that the enclosed oil returns inside in the pulling process. However, if a fluid such as engine oil infiltrates up to the seal sliding region at such time, both the enclosed oil and the fluid such as engine oil are drawn inside. In other words, this characteristic of the typical sealed lash adjuster 100X is a factor in the occurrence of mixing of fluid from outside.

The present invention is devised in light of the above problem, and it is an object of the present invention to provide a sealed lash adjuster and a seal structure between first and second parts, which are capable of preventing or suppressing fluid flowing in from outside and mixing with fluid sealed inside, and more specifically, suitably preventing or suppressing fluid flowing in from outside and mixing with fluid sealed inside by utilizing a difference in plunger speeds in a pressing process and a pulling process.

Means for Solving the Problem

In order to solve the above problem, the present invention is a sealed lash adjuster including: a plunger; and a body accommodating the plunger; wherein a first seal means is provided on a sliding portion of the plunger, and a second seal means is provided on a sliding portion of the body that faces the sliding portion of the plunger.

According to the present invention, the outflow of sealed fluid and inflow of fluid from outside can be separately prevented or suppressed by the first seal means and the second seal means. Therefore, according to the present invention, sealing can be reliably achieved and thus prevent or suppress fluid flowing in from outside and mixing with fluid sealed inside.

The present invention may also be constituted with the first seal means provided on the sliding portion of the plunger and the second seal means provided on the sliding portion of the body that faces the sliding portion of the plunger, such that a space formed between the first seal means and the second seal means expands when the plunger is pressed inward (in a pressing process), and the space formed between the first seal means and the second seal means contracts when the plunger protrudes outward (in a pulling process).

The present invention is achieved by focusing on the fact that a difference in plunger speeds during the pressing process and the pulling process of the sealed lash adjuster causes the formation of oil films with different thicknesses. According to the present invention, it is possible to prevent or suppress the inflow of fluid from outside by drawing out such fluid, and prevent or suppress the outflow of sealed fluid by drawing in such fluid. This in particular enables the present invention to exert a suitable sealing function, and is more advantageous than a case in which the first and second seal means are both provided on the sliding portion of the plunger or on the sliding portion of the body, for example. In the present invention, the first seal means may be provided on the sliding portion of the plunger and the second seal means may be provided on the sliding portion of the body such that the space expands and contracts in a manner opposite to that described above. However, the present invention is more advantageous than such a case in terms of being able to exert a suitable sealing function as described above.

The present invention may be constituted such that the body further includes a through hole that connects the space formed between the first seal means and the second seal means to outside. According to the present invention, the sliding resistance of the plunger can thus be reduced when the sealed lash adjuster is contracted.

The present invention may be constituted to further include third seal means at a portion among an outer wall portion of the body that is more toward an opening portion side of the body than the through hole. According to the present invention, it is thus possible to prevent or suppress the inflow of fluid from outside through the through hole formed in the body.

Further, the present invention is a seal structure between first and second parts, wherein if the first part reciprocally moves and slides against the second part, and there is a difference between movement speeds of the first part during forward movement and backward movement, a first seal means is provided on a sliding portion of the first part, and a second seal means is provided on a sliding portion of the second part that faces the sliding portion of the first part.

According to the present invention, in addition to the sealed lash adjuster, sealing can also be more reliably achieved using a seal structure between first and second parts that includes a first part that reciprocally moves (e.g. a moving member such as a piston), and a second part against which the first part slides (e.g. a holding member such as a cylinder), wherein there is a difference between movement speeds of the first part during forward movement and backward movement. Thus, fluid flowing in from outside and mixing with sealed fluid inside can be prevented or suppressed.

Note that the seal structure between first and second parts focuses on the fact that a difference in movement speeds of the first part during a pressing process and a pulling process causes the formation of oil films with different thicknesses. Thus, the first seal means is preferably provided on the sliding portion of the first part and the second seal means provided on the sliding portion of the second part that faces the sliding portion of the first part, such that a space formed between the first seal means and the second seal means expands when the first part is pressed inward (in the pressing process), and the space formed between the first seal means and the second seal means contracts when the first part protrudes outward (in the pulling process). Consequently, it is possible to prevent or suppress the inflow of fluid from outside by drawing out such fluid, and prevent or suppress the outflow of sealed fluid by drawing in such fluid to exert a suitable sealing function.

Effects of the Invention

The present invention can provide a sealed lash adjuster and a seal structure between first and second parts, which are capable of preventing or suppressing fluid flowing in from outside and mixing with fluid sealed inside, and more specifically, suitably preventing or suppressing fluid flowing in from outside and mixing with fluid sealed inside by utilizing a difference in plunger speeds in a pressing process and a pulling process.

BEST MODES FOR CARRYING OUT THE INVENTION

Hereinafter, best modes for carrying out the present invention will be described in detail with reference to the drawings.

First Embodiment

Figure 1:
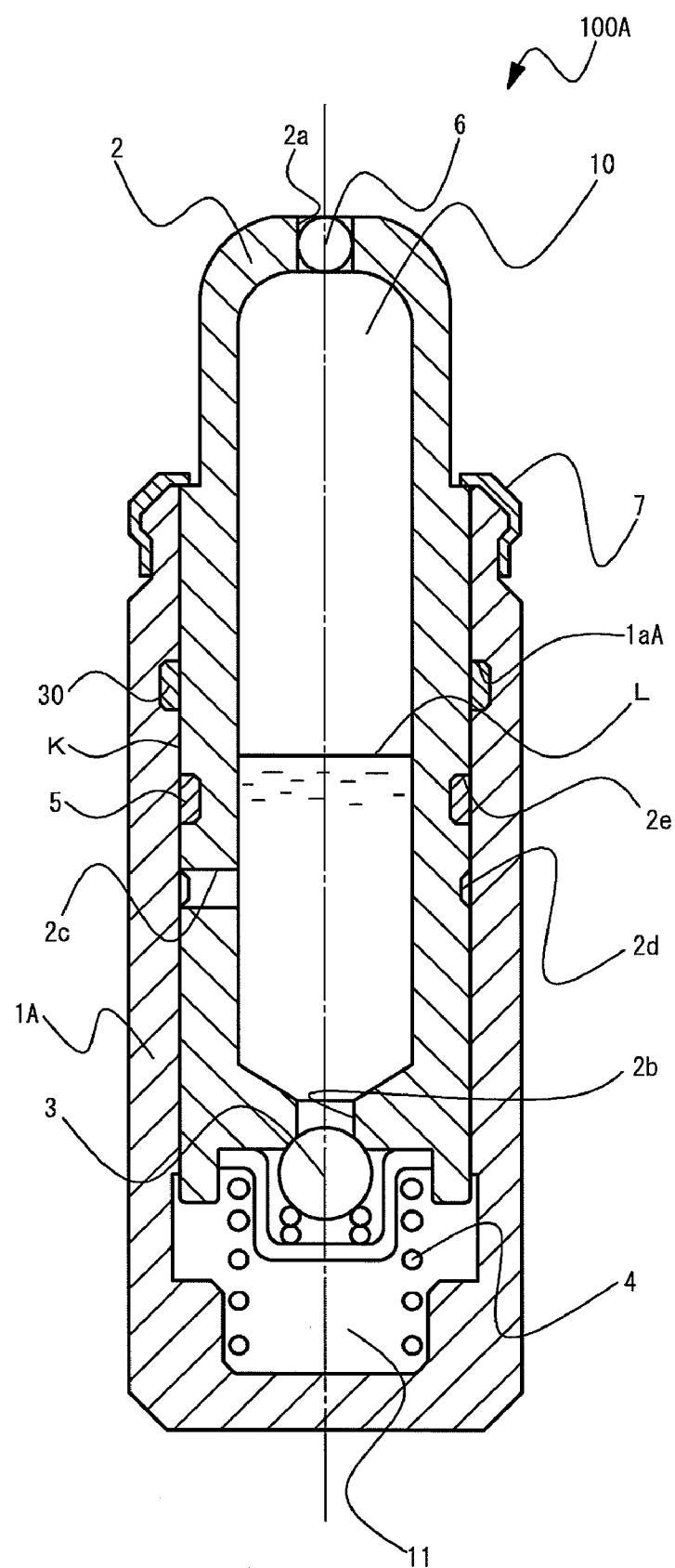
FIG. 1 is a schematic diagram that shows the configuration of a lash adjuster 100A.

FIG. 1 is a schematic diagram that shows the configuration of a sealed lash adjuster 100A (hereinafter referred to simply as a lash adjuster) according to the present embodiment. The lash adjuster 100A has, as a basic constitution, a body 1A, a plunger 2, a check valve 3, a plunger spring 4, a first seal member (corresponding to first seal means of the claims) 5, a ball plug 6, a cap retainer 7, and a second seal member (corresponding to second seal means of the claims) 30.

The body 1A is a bottomed cylindrical member, and the plunger 2 is accommodated within the cylinder so as to be slidable in a direction parallel to a center axis. A distal end portion of the body 1A is provided with the cap retainer 7 for restricting protrusion of the plunger 2. The cap retainer 7 is configured to function as a retainer of the plunger 2, but does not have a function for stopping fluid flowing in from outside. The plunger 2 is a cylindrical member with a reservoir chamber 10 formed therein. Note that the reservoir chamber 10 may be formed into any shape as appropriate. The distal end side of the plunger 2 is formed with an injection hole 2a for injecting oil (fluid), and a ball plug 6 for sealing in injected oil and gas is press fit into the injection hole 2a. Oil is injected in a specified amount and gas (e.g. air or the like from the production atmosphere) is present in the remaining space of the reservoir chamber 10. Silicon oil, for example, may be used as the oil to be sealed.

A rear end portion of the plunger 2 is formed with a through hole 2b that runs through to a high pressure chamber 11, and the check valve 3 is provided in the through hole 2b. The high pressure chamber 11 is formed on the rear end side of the plunger 2, and the plunger spring 4 is provided in the high pressure chamber 11. The check valve 3 opens when the plunger spring 4 biases the plunger 2 so as to protrude toward the distal end side, and allows only the movement of oil from the reservoir chamber 10 to the high pressure chamber 11 while cutting off the reverse movement thereof.

The plunger 2 is formed with a recycling hole 2c that connects the sliding surface and the reservoir chamber 10 such that an opening portion of the reservoir chamber 10 side is always closer to the high pressure chamber 11 side than an oil level L during use. The recycling hole 2c is formed facing the center axis and perpendicular to the center axis. The sliding surface of the plunger 2 is circumferentially formed with a groove portion 2d at the same height (position in the sliding direction) as the recycling hole 2c. In addition, the sliding surface of the plunger 2 on the opening portion side of the body 1A is circumferentially formed with a groove portion 2e, and the groove portion 2e is provided with the first seal member 5 for preventing the leakage of oil to outside. The first seal member 5, closer to the opening portion side of the body 1A than the recycling hole 2c, seals a slight clearance between the body 1A and the plunger 2.

Using the above configuration as the basic constitution of the lash adjuster 100A, in the present embodiment, the lash adjuster 100A further includes a second seal member (second seal means) 30. The second seal member 30 has a configuration for preventing the inflow of external oil, and is disposed in a groove portion 1aA that is formed on the sliding surface of the body 1A. Namely, the lash adjuster 100A has the first seal member 5 on the sliding portion of the plunger 2, and has the second seal member 30 on the sliding portion of the body 1A that faces the sliding portion of the plunger 2.

Figure 2A:
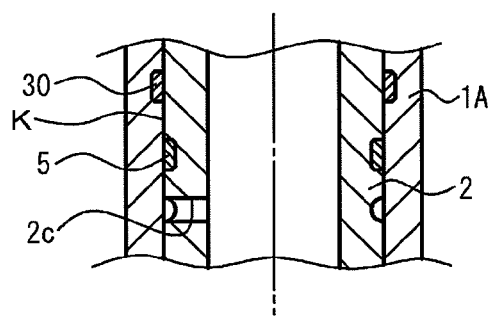
FIGS. 2(a) and 2(b) are enlarged schematic diagrams of first and second seal members 5, 30 in a maximum extended state and a maximum contracted state.
Figure 2B:
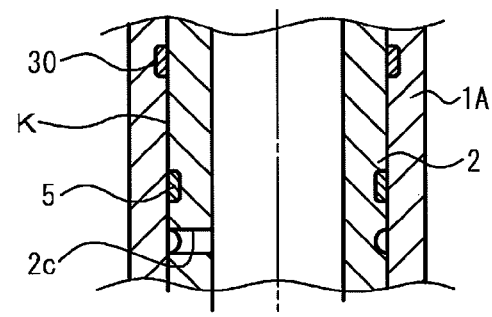

The groove portion 1aA is circumferentially formed on a portion among the sliding surface of the body 1A that is closer to the opening portion side of the body 1A than the groove portion 2e when the lash adjuster 100A is in a maximum extended state. In other words, the groove portions 1aA and 2e are formed such that the first and second seal members 5, 30 do not contact each other when the lash adjuster 100A is in the maximum extended state (see FIG. 2(a)). In the lash adjuster 100A thus formed with the groove portions 1aA and 2e, the first and second seal members 5, 30 are most separated from each other when the lash adjuster 100A is in a maximum contracted state (see FIG. 2(b)).

Specifically, the lash adjuster 100A has the first seal member 5 on the sliding portion of the plunger 2 and the second seal member 30 on the sliding portion of the body 1A that faces the sliding portion of the plunger 2, such that a space K, i.e., a clearance between the body 1A and the plunger 2 that is formed between the first seal member 5 and the second seal member 30, expands when the plunger 2 is pressed inward, and the space K formed between the first seal member 5 and the second seal member 30 contracts when the plunger 2 protrudes outward. Note that the first and second seal members 5, 30 in the present embodiment are specifically realized by O-rings, but may be realized by any suitable sealing part or the like, such as an oil seal. In addition, the cross-sectional shape of the first and second seal members 5, 30 may be any suitable shape, such as a circle or a square, for example.

Figure 3A:
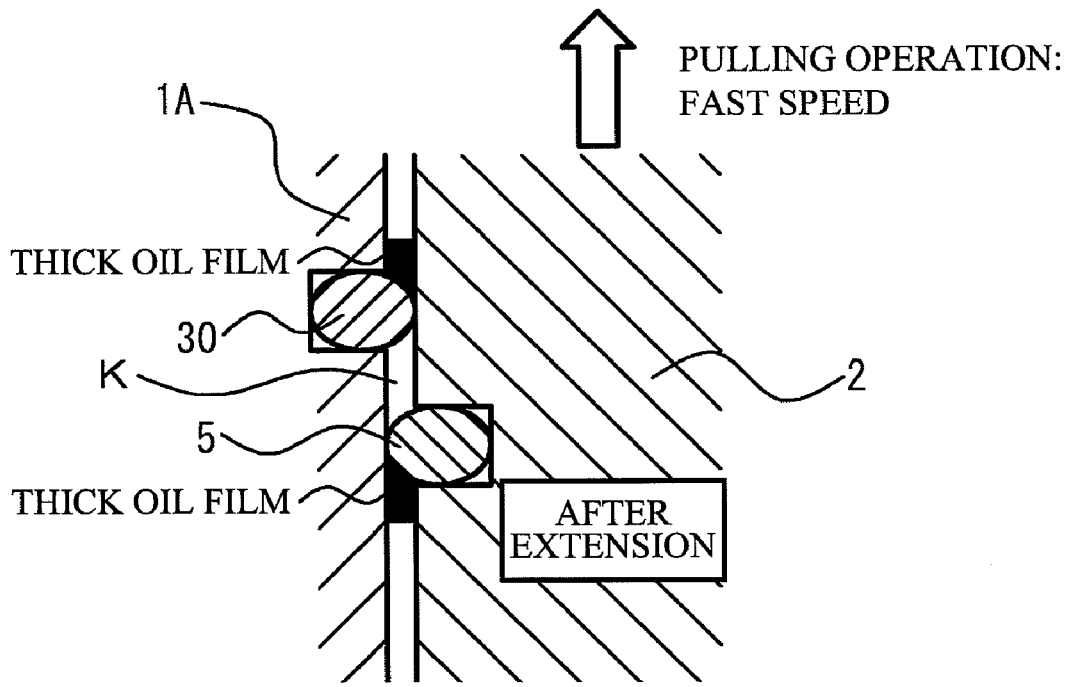
FIGS. 3(a) and 3(b) are enlarged schematic diagrams of a thickness of an oil film formed on the first and second seal members 5, 30 during operation of the lash adjuster 100A.
Figure 3B:
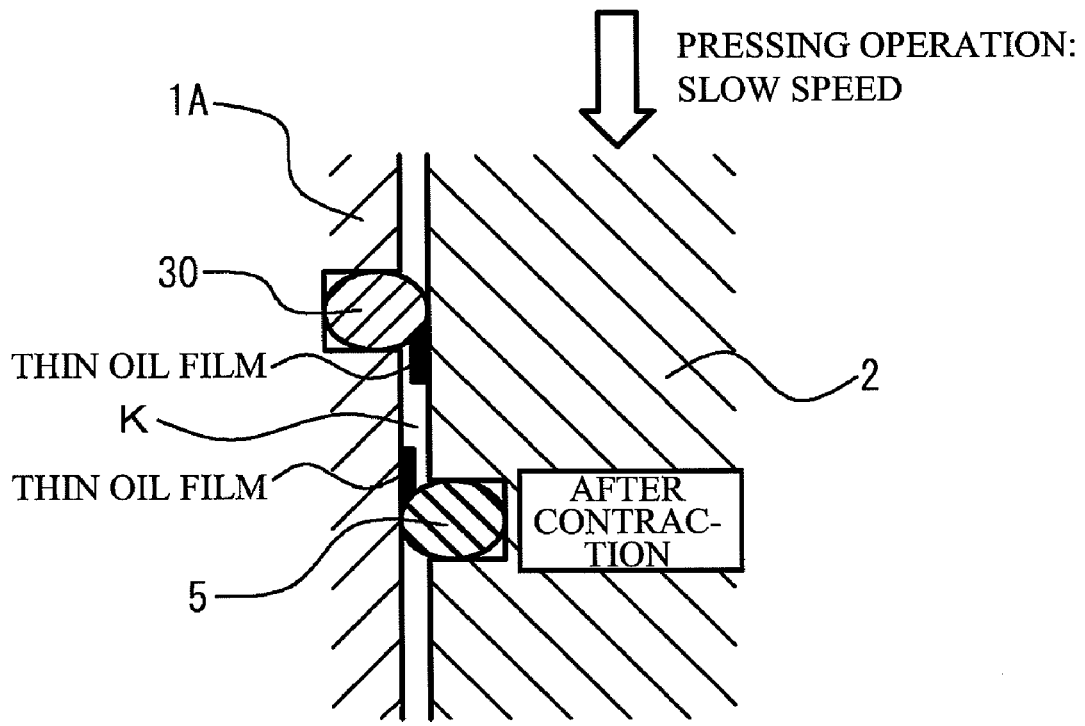

In the lash adjuster 100A, the infiltration of external oil and leakage of enclosed oil can be suitably prevented or suppressed by providing the first and second seal members 5, 30 as described above. FIGS. 3(a) and 3(b) show enlarged schematic diagrams of a thickness of an oil film formed on the first and second seal members 5, 30 during operation of the lash adjuster 100A. FIG. 3(a) shows only a state after extension of the lash adjuster 100A in the pulling process, and FIG. 3(b) shows only a state after contraction of the lash adjuster 100A in the pressing process. A thick oil film of enclosed oil formed in the pulling process at the first seal member 5 as shown in FIG. 3(*a*) is drawn inside with the formation of a thin oil film in the pressing process as shown in FIG. 3(*b*). Further, a thick oil film of external oil formed in the pulling process at the second seal member 30 as shown in FIG. 3(*a*) is drawn outside with the formation of a thin oil film in the pressing process as shown in FIG. 3(*b*).

Specifically, in the lash adjuster 100A, the first seal member 5 on the plunger 2 side exerts a drawing-in effect on the enclosed oil and the second seal member 30 disposed on the body 1A side exerts a drawing-out effect on the external oil. Therefore, exchanges between enclosed oil and external oil can be eliminated and a suitable sealing function can be realized as a consequence. Thus, the lash adjuster 100A can prevent or suppress fluid flowing in from outside and mixing with fluid sealed inside.

Second Embodiment

Figure 4:
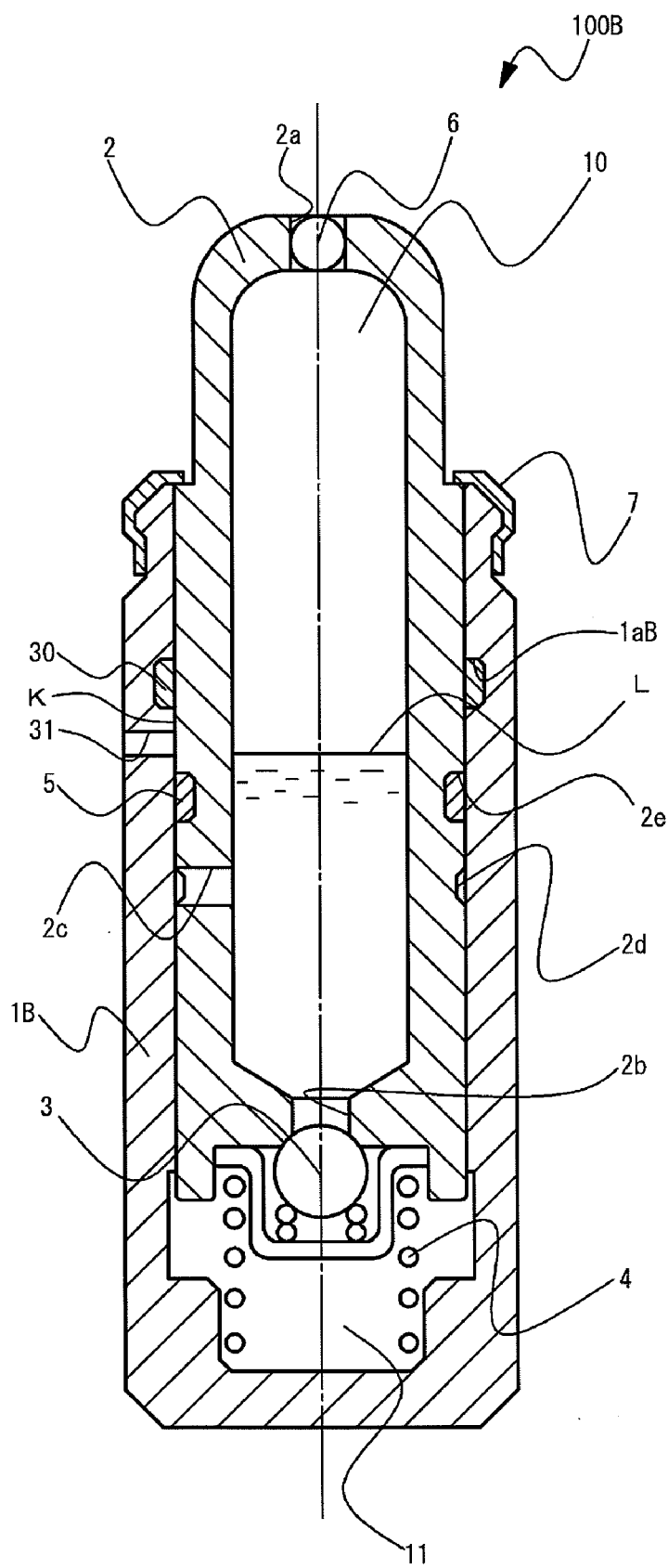
FIG. 4 is a schematic diagram that shows the configuration of a lash adjuster 100B.

FIG. 4 is a schematic diagram that shows the configuration of a lash adjuster 100B according to the present embodiment. Aside from having a body 1B in place of the body 1A, the lash adjuster 100B is identical to the lash adjuster 100A in practice. Aside from further including a through hole 31 that connects the space K formed between the first seal member 5 and the second seal member 30 to outside, the body 1B is identical to the body 1A in practice. The through hole 31 is disposed so as not to interfere with the seal sliding regions of the first and second seal members 5, 30. Note that when forming the through hole 31, consideration is preferably given such that the body 1B does not become extremely thin because of the relationship with a groove portion 1aB and burrs are not generated during production. According to the lash adjuster 100B, an increase in the internal pressure of the space K during contraction of the lash adjuster 100B can be suppressed. Therefore, the lash adjuster 100B is favorable in terms of being able to further reduce the sliding resistance of the plunger 2 compared to the lash adjuster 100A.

Third Embodiment

Figure 5:
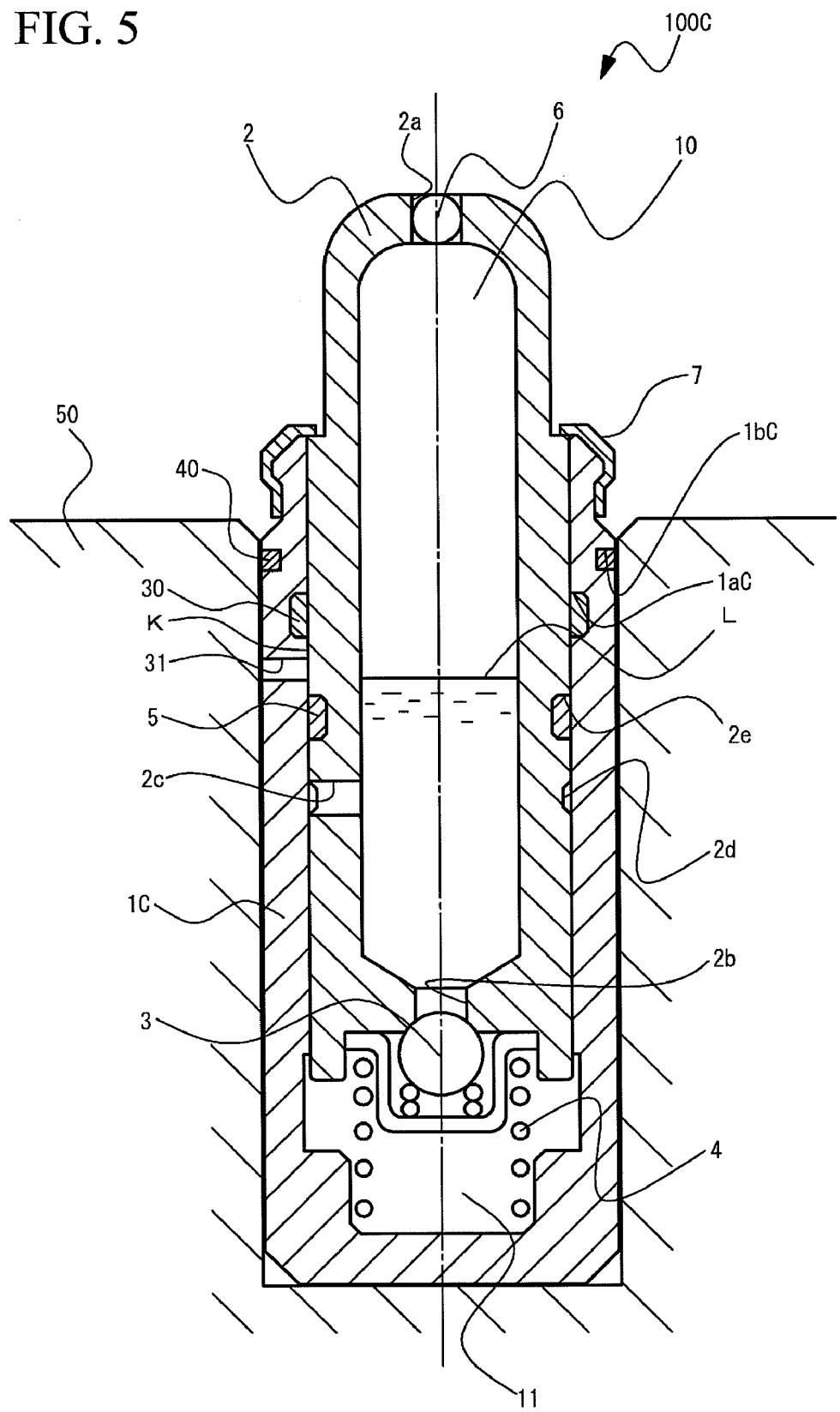
FIG. 5 is a schematic diagram that shows the configuration of a lash adjuster 100C.
Figure 6:
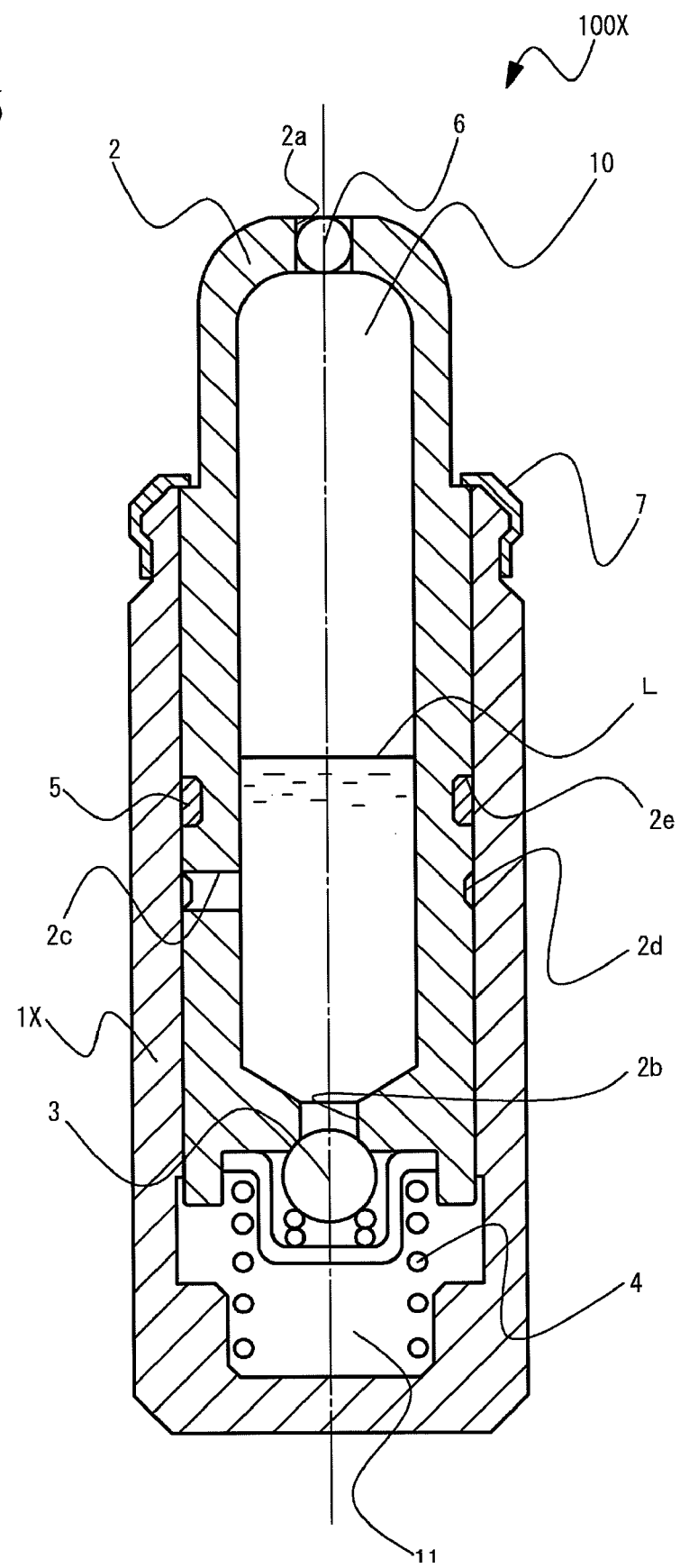
FIG. 6 is a schematic diagram of the configuration of a conventional sealed lash adjuster 100X that has one sealing means on a sliding portion of a plunger 2.
Figure 7A:
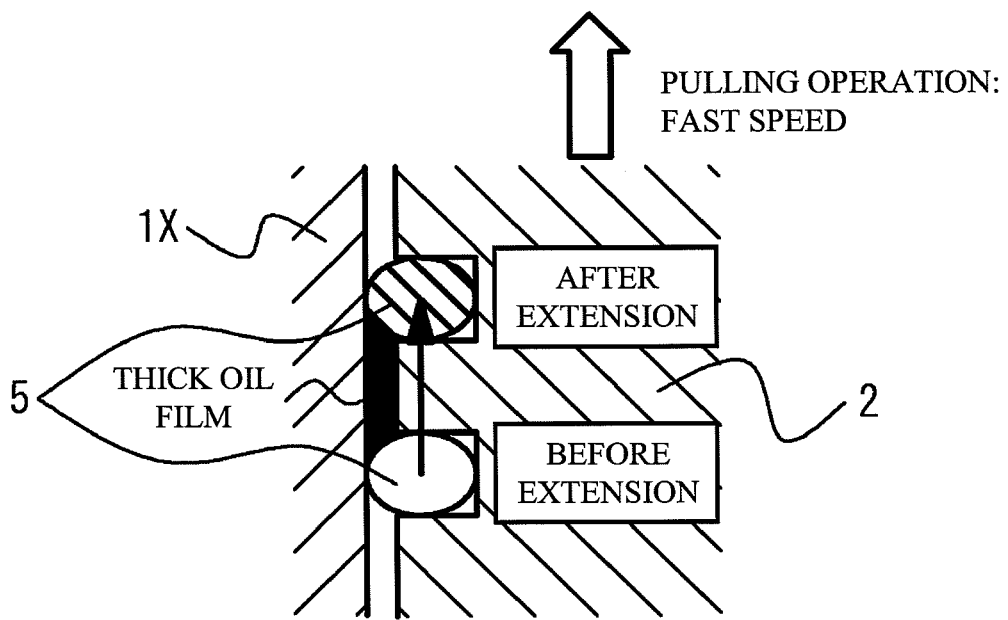
FIGS. 7(a) and 7(b) are enlarged schematic diagrams of a thickness of an oil film formed on the first seal member 5 during operation of the lash adjuster 100X.
Figure 7B:
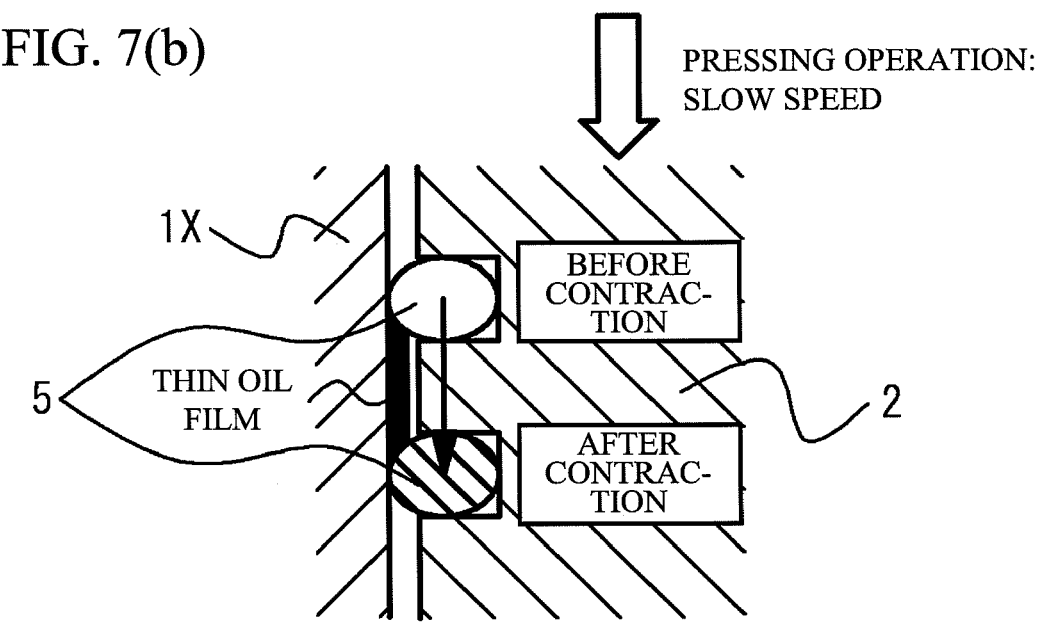

FIG. 5 is a schematic diagram that shows a lash adjuster 100C according to the present embodiment. Note that, in FIG. 5, the lash adjuster 100C is shown assembled to a cylinder head 50. Aside from having a third seal member (corresponding to third seal means of the claims) 40 and having a corresponding body 1C in place of the body 1B, the lash adjuster 100C is identical to the lash adjuster 100B in practice. Aside from having a groove portion 1bC at a portion more toward the opening portion side of the body 1C than the through hole 31 and at a portion accommodated in the cylinder head 50, which is a component to be assembled with the body 1C, the body 1C is identical to the body 1B in practice.

Specifically, the third seal member 40 is mounted in the groove portion 1bC and has a configuration for protecting against the inflow of external oil between the cylinder head 50 and the lash adjuster 100C. Note that the third seal member 40 in the present embodiment is specifically realized by an O-ring. However, the third seal member is not limited to this example and may be realized by any suitable sealing part or the like, such as an oil seal. Accordingly, the lash adjuster 100C having the third seal member 40 is favorable in terms of being able to further prevent or suppress external oil flowing into the space K through the through hole 31 compared to the lash adjuster 100B.

The above embodiments are preferred examples for carrying out the present invention. However, the present invention is not limited to these examples, and various modifications are possible within the scope of the present invention. For instance, the first embodiment is an example of a seal structure between first and second parts according to claims 5 and 6, in which the first part corresponds to the plunger 2 and the second part corresponds to the body 1A. However, in the seal structure between first and second parts according to claims 5 and 6, the first and second parts are not limited to this example, and may be a piston and a cylinder, or the like.

The invention claimed is:

1. A sealed lash adjuster comprising
a plunger, and a body accommodating the plunger, wherein
a first seal means is provided on the sliding portion of the plunger and a second seal means is provided on the sliding portion of the body that faces the sliding portion of the plunger, such that a space formed between the first seal means and the second seal means expands when the plunger is pressed inward, and the space formed between the first seal means and the second seal means contracts when the plunger protrudes outward.

2. The sealed lash adjuster according to claim 1, wherein the body further comprises a through hole that connects the space formed between the first seal means and the second seal means to outside.

3. The sealed lash adjuster according to claim 2, further comprising:
third seal means at a portion among an outer wall portion of the body that is more toward an opening portion side of the body than the through hole.

4. A seal structure between first and second parts, wherein the first part reciprocally moves and slides against the second part, and there is a difference between movement speeds of the first part during forward movement and backward movement,
a first seal means is provided on the sliding portion of the first part and
a second seal means is provided on the sliding portion of the second part that faces the sliding portion of the first part, such that a space formed between the first seal means and the second seal means expands when the first part is pressed inward, and the space formed between the first seal means and the second seal means contacts when the first part protrudes outward.

* * * * *